Dec. 20, 1966  R. C. VANSTRUM  3,292,507
MARKERS
Filed March 24, 1965
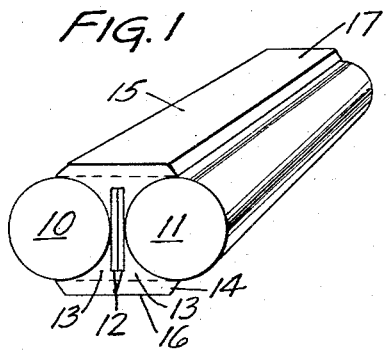
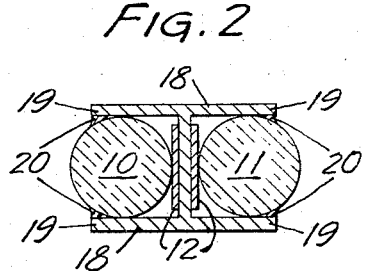
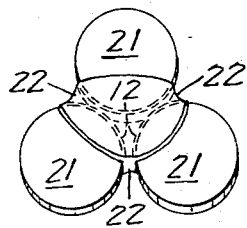
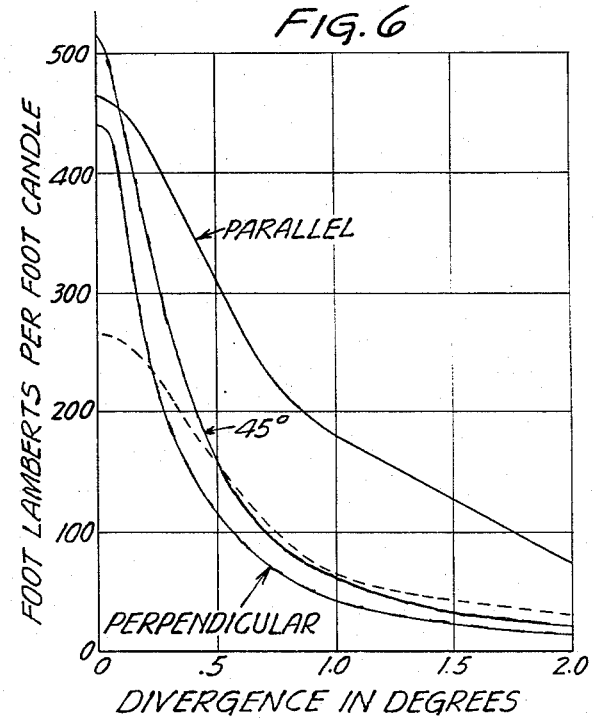
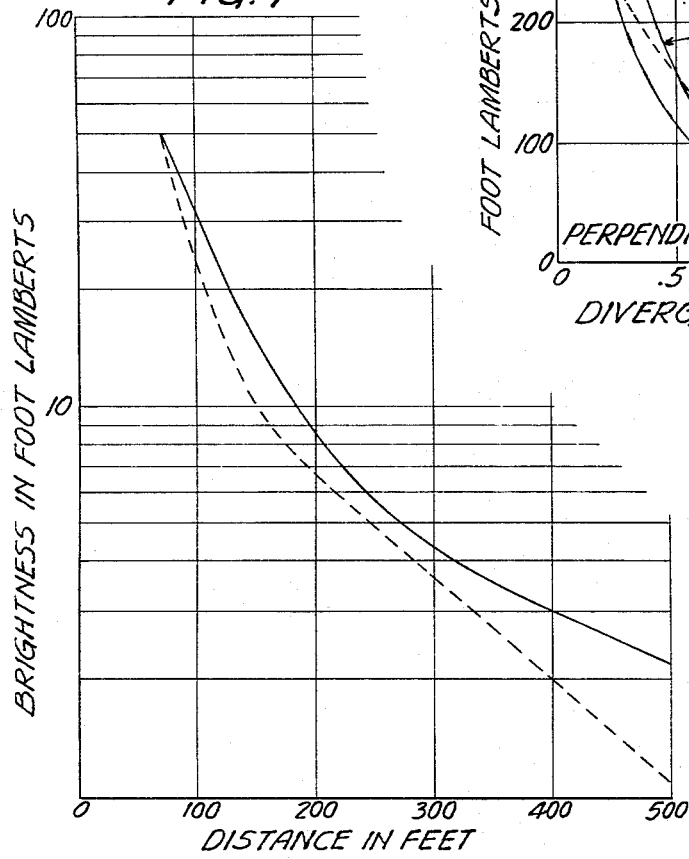
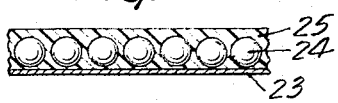
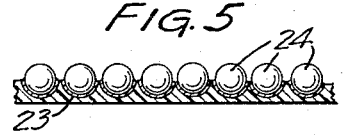
INVENTOR
ROBERT C. VANSTRUM
BY
Carpenter, Abbott, Coulter & Kinney
ATTORNEYS United States Patent Office 3,292,507
Patented Dec. 20, 1966

3,292,507
MARKERS
Robert C. Vanstrum, White Bear Lake, Minn., assignor to Minnesota Mining and Manufacturing Company, St. Paul, Minn., a corporation of Delaware
Filed Mar. 24, 1965, Ser. No. 444,934
12 Claims. (Cl. 94—1.5)

This application is a continuation-in-part of my application Serial No. 337,034, filed January 10, 1964, now abandoned.

This invention relates to novel substantially-flat reflex-reflecting markers especially adapted for use on horizontal surfaces where they may be subjected to foot and vehicular traffic abrasion and wear in use.

Heretofore, substantially horizontal surfaces such as roadways and other surfaces for vehicular traffic have been marked with reflex-reflecting material which characteristically has consisted essentially of small glass beads of about 1.5 refractive index partially embedded in a light-reflecting pigmented paint-like film. Incident light striking such markings at a large angle from normal (or in other words, at an angle varying slightly from parallel) is reflex-reflected in a cone of some divergence back toward its source. However, when such markings are covered with a film of water as occurs during a rain, their effectiveness to reflex-reflect light is seriously impaired. Further, vehicular abrasion of glass beads partially embedded in paint tends to flatten the upper surfaces of the glass beads after a period of time, thus impairing their ability to reflex-reflect light even under dry conditions.

This invention provides reflex-reflecting markers which exhibit a higher intensity reflex-reflection of light under dry conditions on horizontal surfaces than the beads-on-paint prior art structure heretofore widely used. The markers of the invention also exhibit high intensity reflex-reflection of light under wet conditions on horizontal surfaces. Further, the markers hereof exhibit high resistance to deterioration of reflex-reflection as a result of traffic abrasion.

The invention makes it possible to employ high index transparent spheroids for horizontal marking purposes while at the same time protecting such spheroids from the abrasive action of traffic passing thereover. Thus, even though some high index glass beads are known to be less wear resistant than the lower index glass beads heretofore conventionally used in traffic markings, use of high index beads in horizontal markings according to the teachings hereof does not introduce a commensurate higher wear factor, which is contrary to what would be expected.

The invention will be described by reference to a drawing, made a part hereof, in which:

FIGURE 1 is a schematic perspective view of a preferred embodiment for markers hereof;

FIGURE 2 is a schematic sectional view through an alternative embodiment for markers of the invention;

FIGURE 3 is a schematic perspective view of a still further embodiment of the invention;

FIGURES 4 and 5 are schematic sectional views of illustrative known beaded reflex-reflecting materials useful in forming part of the markers hereof;

FIGURES 6 and 7 are graphs of light reflection exhibited by a marker formed according to the invention.

Referring now to FIGURE 1, the features of that embodiment for markers of the invention will be described in terms of common elements useful in forming the same. Markers of that embodiment have two aligned masses in the nature of rods 10 and 11, it being critical that at least one of the rods is transparent. Preferably both are transparent. These rods are spaced from each other a distance at least sufficient to allow at least one and preferably two layers or strips of reflex-reflecting material 12 to be inserted therebetween, with the reflex-reflecting faces of each layer 12 directed respectively toward the rod with which it is in closest proximity. The width of strips 12 is preferably no greater than the thickness or height (i.e., diameter) of the thicker rod 10 or 11. Where rods 10 and 11 are of equal diameter, as is preferred, the width of strips 12 will be no greater than about the thickness of either rod.

Strips 12 are bonded together and are firmly bonded (and essentially encapsulated or embedded in resin) in position between rods 10 and 11, thereby to provide a resulting marker in which reflex-reflecting material is protected against traffic wear by solid rod-like masses associated integrally therewith. Of course, the binder material 13 located between the reflex-reflecting face of at least one strip 12 and a transparent rod in front of the same must be transparent. In usual practice the binder between the face of the strips 12 and transparent rods in front thereof is transparent in order to achieve reflex-reflective performance for both lateral faces of the enlongated structure.

While not absolutely essential, it is preferred to provide a build-up of material, or wear-cap 14 and 15 over the area of juncture containing the reflex-reflective material between the rods 10 and 11. Such caps further shield embedded reflex-reflective material within the marker from traffic wear and reinforce the rod members against breakage when the composite marker is positioned with either its bottom 16 or top 17 surface (both preferably being flat) on a horizontal traffic way.

The embodiment of the marker illustrated in section in FIGURE 2 includes an I-beam 18 of material, suitably metallic or plastic material, having reflex-reflecting material 12 bonded along the internal recesses of the I and transparent rods 10 and 11 bonded so as to lie in front of the reflex-reflecting faces of the strip material 12 and preferably somewhat within the legs 19 of the I so as to remain slightly shielded by said legs 19. As illustrated in the drawing, the rods for this embodiment may be sealed in position with bond resin 20 along the portions thereof adjacent edge portions of legs 19 of the I-beam 18. Ends of each marker may also be sealed with a plate or cap of bond material. In this manner, an air interface (i.e., an air space between the reflex-reflecting material and rods 10 and 11) may be preserved for the reflex-reflecting material, if desired or required for improved brilliancy of reflection.

In FIGURE 3, the embodiment illustrated is that formed by three disc-like pieces 21, arranged in a triangular manner. Reflex-reflecting material 12 is bonded within the internal area defined by the triangular arrangement of disc-like members 21, and is oriented with its reflex-reflecting face toward the disc-like member with which each portion of the reflex-reflecting material is closest associated. Preferably all disc-shaped pieces are transparent, but at least one is transparent and is associated with internal reflex-reflecting material 12. The pieces 21 and associated reflecting material are held together by a bond material 22, which may take the form of a cap or cover extending over the innermost portion of the discs of the structure. If desired, markers satisfying the required optical and flatness characteristics for horizontal roadway use may be formed so as to be made up of the elements in one-third of the structure illustrated in FIGURE 3, that is, with one disc 21, covered on its rim with reflex-reflecting material 12 (extending over no more than about one-half of its rim), and the resulting structure preferably provided with a cap or cover of resinous material over the reflex-reflecting material and adjacent portion of the disc. Similarly, markers such as illustrated in FIGURES 1 and 2 may be modified to consist of only one of the rod elements and associated structure illustrated in those figures.

As will be evident from a comparison of the FIGURES 1, 2 and 3, reflex-reflecting material 12 may either be affixed snugly with its reflex-reflecting face upon the interior side of a rod or disc-like member or positioned in spaced relationship from the interior of a rod or disc-like member.

Suitable layers or strips of reflex-reflecting material for use in forming structures of the invention are formed according to the teaching of Palmquist et al. U.S. Patent No. 2,407,680 granted September 17, 1946, the disclosure of which is here incorporated by reference. Briefly, as illustrated in FIGURE 4 hereof, these reflex-reflecting materials include a back reflector 23, a compact monolayer of transparent beads or spheroids 24, and a binder layer 25 to hold the beads in position in front of the reflector 23. The binder layer 25 in these structures has a flat front face; and this necessitates a special relationship between the refractive index of the spheroids 24 and the material of layer 25 interposed in front of the spheroids 24. The relationship is such that the refractive index of the spheroids is at least 1.15 times that of the refractive index of the transparent covering 25 in order to gain desired intensity of light reflex-reflection. Preferably the relationship is such that the index of the spheroids is at least about 1.3 times that of the transparent covering 25. Additionally, improvements in reflex-reflective brilliancy are gained in structures of this type by spacing the transparent spheroids 24 slightly from the reflective layer 23, as taught in the aforenoted Palmquist et al. patent. This spacing is gradually reduced to zero as the refractive index of the spheroids approaches a figure of about 1.9 times that of the refractive index of the transparent covering. Since the refractive index of most transparent binders useful in forming structures of this type is at least about 1.3 up to about 1.5 or slightly higher, the refractive index for spheroids for these structures is generally required to be above about 1.8 or 1.9, and preferably above about 2.1, so as to maintain the proper relative relationship between the spheroid and binder refractive indices and reduce the spacing required for brilliant reflex-reflection of light.

Although reflex-reflecting beaded sheet material of the flat front face type as aforenoted is preferred for use in forming structures according to the invention, and allows for thorough embedding of the reflex-reflecting strips within the body of my markers, it also is possible to use reflex-reflecting sheet material of the lenticular type in preparing structures satisfying fundamental requirements of the invention. For example, lenticular reflex-reflectors as illustrated in FIGURE 5 are useful. They consist essentially of a compact monolayer of transparent spheroids 24 having a refractive index of at least about 1.7 up to about 2.0, only partially or hemispherically embedded in a binder material 25, with associated underlying specular-reflective means 23. Useful lenticular structures are taught in detail in Gebhard et al. U.S. Patent No. 2,326,634 granted August 10, 1943, the disclosure of which is here also incorporated by reference.

Where lenticular surfaced reflex-reflecting sheet materials are employed, it has been found preferable to encapsulate, but not embed, the sheet material within structures of the invention so as to leave an interface of air (although only a slight interface of air is all that is necessary, essentially tangential contact of lenticular elements to overlying transparent masses being permissible) between the lenticular reflex-reflecting face of the structure and any transparent binder material or rod material of a refractive index higher than that of air. Such structures are conveniently formed using the structural features illustrated in FIGURE 2, inasmuch as the seal 20 between rods 10 and 11 and the I-beam 18 may be limited to the terminal portion of the leg area 19 adjacent the rods 10 and 11 and each end of the marker structure. Considerably greater difficulty from a manufacturing standpoint is encountered whenever markers of the invention are formed with the structural relationships illustrated in FIGURE 1 but with reflex-reflecting sheet material as illustrated in FIGURE 5 and an air interface between the reflex-reflecting face thereof and the associated rod 10 or 11 in the structure. To preserve an air interface for such structures, a lay-up of reflex-reflecting sheets and rods (in respective positions as illustrated in the drawing) is placed over a band of bond resin to form cap member 14, and thereafter the structure is inverted and placed over a further band of bond resin to form cap member 15, following which end plates or caps of resin may be bonded to each end of the member.

A preferred requirement for markers of the invention is that they are of substantial flatness so as to constitute essentially no vertical obstruction when laid upon a horizontal surface. They should have an essentially flat base surface; and preferably they are essentially flat on both their base surface and their upper top surface, so that either surface may in effect serve as the "base" surface. This permits the markers to be applied to a horizontal roadway in partially embedded condition in a paint film or other binder film without regard to special attention as to which surface of the marker is pressed or dropped on the film of paint or binder material. The height of the markers should preferably not be greater than about 10 millimeters (between the base surface and the upper or top surface), or possibly no more than 15 millimeters, so as to gain substantial flatness. Heights no greater than 8 or 6 millimeters are also suitable. Area dimensions perpendicular to the height dimension should be at least about 1.2 or even 1.5 times greater than the height dimension, and preferably at least about 2 times greater than that dimension. Logically, an area dimension as low as about 1.2 or 1.5 times the height dimension would seem impossible where two cylindrical rods are employed as, for example, illustrated in FIGURE 1; but it should be recognized that, for example, hemicylindrical or thinner sections of rods may be employed to gain the results taught herein. Thus, the requirement for area dimensions is to be interpreted as a requirement for having a flattened type structure as distinct from one which would roll or turn on different edges when placed on a roadway or centerline or center island or the like. As a practical matter, one area dimension perpendicular to the height dimension should be no greater than 80 times the height dimension; longer markers are difficult to apply on a horizontal surface with any expectancy that the marker will remain unbroken after traffic passes thereover, whether foot or vehicular. Also, from a practical standpoint in regard to conservation of material, the area dimension transverse to the aforementioned area dimension preferably is not greater than about 4 or possibly 6 times the height dimension of the marker, with disc-like members possibly having area dimensions in all directions up to about 10 or 12 times the height dimension of the marker (but under no circumstances greater than 80 times the height dimension thereof).

An illustrative presently preferred procedure to use in forming a marker according to the invention, especially a marker as illustrated in FIGURE 1, will now be given. Ordinary glass rods of commerce having a diameter of approximately 5 millimeters were scored and broken into 8 inch lengths and then immersed for about 10 minutes in a conventional concentrated sulfuric acid-dichromate cleaning solution, followed by rinsing in water. Next, the rods were immersed for about 2 minutes in a 1% water solution of an amino-silane, withdrawn from the solution, and dried at an elevated temperature of about 250° F. Cleaning treatments and coating treatments to improve resin adhesion to glass rods may be varied as desired— such treatments being well known. Indeed, where strong adhesion is not particularly critical, or where rods of organic plastic material (e.g., polycarbonate, polyvinyl chloride, methyl methacrylate or the like) are employed, such pretreatments are frequently unnecessary. Inherently, however, where higher wear resistance and abrasion resistance are desired for the composite markers of the invention, it is preferable to employ harder transparent materials such as glass and to use conventional treatments to gain strong resin adhesion.

After treating the rods as aforedescribed, they were aligned in a series, side by side, by placing them in a grooved mold having parallel notches spaced so that the rods were almost touching. Then a reflex-reflecting sheet structure of the type illustrated in FIGURE 4 and taught in Palmquist et al. U.S. Patent No. 2,407,680 was selected. The specific structure selected was one having transparent glass microspheres of about 50 microns diameter in a compact monolayer transparently spaced by resin in the amount of about 15 microns from a back reflector of aluminum and held in a resin binder layer of about 1.5 refractive index having a flat front surface as illustrated in FIGURE 4. The microspheres in the structure had a refractive index of about 2.26, or about 1.5 times the refractive index of the transparent covering binder.

This beaded reflex-reflective sheet material was coated with about a 6 mil thick coating of a viscous liquid resinous mixture consisting of approximately equal parts of an epoxy resin ("Epon 828") and a polyamide resin ("Versamid 125").

Epoxy resins, i.e., resinous glycidyl polyethers, are available commercially, and have, on the average, more than one 1,2-epoxy group in a molecule. As is well known, they may be produced by the reaction of 2,2-bis(4-hydroxyphenol) propane (i.e., Bisphenol A) and epichlorhydrin in alkaline media at elevated temperatures within the approximate range of 50–150° C. In the reaction, Bisphenol A may be replaced in whole or part by various other polyhydric phenols, e.g., resorcinol, 2,2-bis(4-hydroxyphenol)-butane, etc. or polyhydroxy compounds such as ethylene glycol, etc. Likewise, sources of epoxy radicals other than epichlorhydrin may be employed in the reaction. "Epon 828" is a liquid epoxy resin, which melts at 8–12° C., has a Gardner-Holt viscosity at 25° C. of Z5 to Z6, and an epoxide equivalent of about 190 to 210. In other words, about 190 to 210 grams of this resin contain one gram equivalent of epoxide, i.e., oxirane oxygen.

The polyamide resin reacts with the epoxy resin to produce hardening of the composition, and is the addition product of polymerized long chain fatty acids and polyfunctional primary and secondary amines. The particular polyamide resin chosen for the foregoing composition, "Versamid 125," is stated by its manufacturer, General Mills, Inc., to have an average molecular weight of 2000, an acid number of 7, and a Brookfield viscosity of about 45,000 to 55,000 centipoises at 23° C.

The transparent resinous mixture here described is considered preferable from a strength and wear standpoint; but any of a variety of thermosettable or thermoplastic solid transparent resinous materials (e.g., polyurethane resins, polyester resins, polyamide resins alone, etc.) are suitable to employ as the bond material and cap or sealing material in the structures hereof.

After applying the epoxy-polyamide mixture over the flat front face of the reflex-reflecting sheeting, the coated side of the sheeting was placed face down over the glass rods in the grooved mold, pressed slightly to secure adhesion of the rods to the coated face of the sheeting, and the entire assemblage of adhered rods and sheeting lifted from the grooved molds, inverted and placed on a metal plate support in an oven, where it was cured for about 20 to 30 minutes at 200° F. with a metal plate over the top of the spread to keep the entire assemblance flat. After removal from the oven, the assemblage was split in half, and the rear faces of the reflex-reflecting material of each half adhered together by using a pressure-sensitive adhesive such as, for example, one described in Ulrich patent Re. 24,906 (e.g., an acrylic acid-acrylic ester copolymer). Care was used to secure the backs of the reflex-reflective sheeting together so that rods on each half of the assemblage were adhered in aligned relationship; and this is best accomplished by replacing the halves of the assemblage in cooperating grooved molds which are folded together to form the complete product assemblage. Then the completed assemblage was cut between paired rods so as to provide a plurality of elements having reflex-reflective sheeting back to back in the interior and rods positioned over the face of each side of the sheeting as illustrated in FIGURE 1. Rough edges left after the cutting operation were trimmed, as by abrading.

Thereafter, each "twin rod" assemblage may be capped on each side by an operation involving drawing a ribbon of the aforedescribed resinous mixture in a highly viscous state on a release liner, positioning the twin rod assemblage with one side of its exposed joint over the ribbon, and curing the resin ribbon cap for 20 to 30 minutes at 200° F. Alternatively, a suitable seal over joints may be formed by simply drawing a ribbon of resinous material over the exposed joints between rods of the twin rod assemblage, followed by curing if a curable resin material is used.

Either prior to capping, or subsequent thereto, the markers may be cut into shorter lengths, abraded to a smooth condition, and the edges or ends sealed, if desired, with a thin spread, e.g., about 1 mil thickness, of resinous material, suitably the resinous material aforedescribed.

The performance of the structure just described is graphically set forth by solid lines in FIGURES 6 and 7. The dash lines (i.e., lines of uniformly sized dashes) in these figures represent the reflex-reflective light return of the reflex-reflective sheeting alone of this structure under the conditions set forth in the drawing. It will be observed that the light return performance of the structure hereof under "parallel" conditions was greater than that of reflex-reflective sheeting alone, within the limited angles of divergence noted in FIGURE 6. Under parallel conditions, the incident light is placed in the same plane as the horizontally positioned marker and the divergence is taken along a line parallel with the horizontal marker and in the same plane as the incident light. The curve labeled 45° is that for the light return of the described structure at divergence angles along a line 45° from parallel and perpendicular, whereas the "perpendicular" curve represents the light return at divergence angles along a line perpendicular (i.e., vertical) to the marker.

FIGURE 7 more graphically sets forth what a driver of an automobile would experience as he drives down a lane adjacent a center island and approaches a marker of the invention positioned in the center island or line of a highway. As there illustrated, the driver actually would experience a greater light return when approaching the marker of the aforedescribed specific example (solid line) as compared to what he would experience with a vertically positioned sheet of the reflex-reflective material alone (dash line) of that example. This result appears to be particularly surprising inasmuch as the rod material interposed in front of the reflex-reflecting material would seem at the very least to effect some light absorption. While it may be indeed absorb some of the light which passes through it, it also appears to serve in some manner as a lens element effecting some correction or reduction of the amount of divergence of light retrodirected by the marker. It also has been found that the index of refraction of the rod members having air interface exposed curves does not appear to be particularly critical in these markers; and likewise, it is not critical that the reflex-reflecting material be positioned at the focal point of the curvature of the lens or rod material. Indeed, the improved light return appears simply to be accountable by the fact that the exposed surface of the marker receiving light from an incident source is curved to some extent and therefore functions in a slight manner as a lens in addition to functioning as a barrier protecting the reflex-reflecting material as well as affording flatness features as aforediscussed.

An interesting relationship between the curvature of the exposed surface of the rod members and the size of spheroids used in reflex-reflecting material of the marker may be expressed in terms of relative radius. In preferred structures exhibiting the most efficient improved light return, the radius of the rod lens is at least about 10 times greater than the radius of spheroids in the reflex-reflecting material, and preferably at least about 30 or 40 times that radius up to about 100 or even 200 times that radius. In the illustrated specific example, the radius of the exposed curvature of the rods was approximately 100 times the radius of microspheres in the reflex-reflecting material. From a practical standpoint, because of the problem of selecting a mass of spheroids all having the same radius, the aforenoted relationships must be considered in terms of average radius for the spheroids and lens masses.

It will, of course, be understood that the rods useful in forming structures according to the teachings herein may vary in cross section considerably. Rods consisting essentially of half cylinders mounted with their flat side against the front face of reflex-reflecting material are useful, as also are rods having an elliptical cross section or a hexagonal or other angular cross section, even including triangular or square-shaped rods. However, rods having a flat front face are relatively less effective as compared to the curved rods in terms of correcting or reducing divergence of light returned by the reflex-reflecting material of the structure. Nevertheless, particularly in the case of structures employing smaller rods on the order of about 2 millimeters, or even 1 millimeter, in width and height (or even somewhat less) flat faced rods provide a resulting reflex-reflecting composite marker surprisingly effective as a means for returning light striking horizontal surfaces whether the reflector is dry or covered with a film of water.

If desired, the solid transparent wear-resistant masses oriented in front of reflex-reflecting material to form the markers thereof may, as aforenoted, be formed of plastic organic material. Organic materials useful for this purpose ordinarily should, however, be at least as scratch-resistant as the polymethylmethacrylate of commerce marketed under the trademark "Lucite." A suitable test for determining scratch-resistance is as follows: Mount a sample of reflect-reflecting sheeting, reflective side up, on a rigid flat substrate. Over the reflective side, place a sample of the material to be treated. Photometrically measure light retroreflection through the sample and note the value. Then, using the abrasion apparatus arrangement described in ASTM D 968–51, allow five pounds of sand particles within the range of 30 to 40 mesh U.S. Standard (Ottaway sand) to fall on the test sample. Thereafter, again photometrically measure the light retroreflection of the sample. The value obtained, as compared to the original reading, is reduced by the amount of scratching caused by the sand on the sample of material undergoing test. Divide the final photometric value by the original value to gain the percent of light retroreflection retained after the sand treatment. The value for polymethylmethacrylate is about 0.3 or about 25–30%. Materials having a value of at least about 0.2, preferably about 0.3 or 0.4 or more, exhibit satisfactory scratch resistance for use in markers of the invention. The value for glass in this test is essentially 1.0 or 100%.

As will be evident to those skilled in the art, many variations of the foregoing specific disclosure are possible. Different structural configurations from those specifically illustrated may be employed.

Also, colored reflex-reflective material or colored binder or rods may be used in accordance with a pre-arranged code. For example, one side of markers may be formed to reflect red and other side green, with the result that the markers may be used to regulate traffic flow patterns.

While the height of my markers preferably is not greater than about 10 millimeters (between base and upper surface), or possibly about 15 millimeters, recognition should be made of the fact that markers embodying the principles of the invention may in fact have a height up to approximately one inch or approximately 25 millimeters. Even a height of 30 millimeters may be useful in certain decorative applications or sign applications for novelty effects. However, even in the case of novelty effects, the heights here discussed are considered maximums from a practical and versatile standpoint.

That which is claimed is:

1. Small discrete horizontally-reflex-reflecting markers having an essentially flat base surface and being no greater in height than approximately one inch above said base surface, with area dimensions perpendicular to said height dimension all being at least 1.2 times greater than said height dimension and no greater than 80 times said height dimension, each of said markers comprising at least one layer of reflex-reflecting material oriented essentially perpendicular to the flat base surface thereof, said reflex-reflecting material consisting essentially of a monolayer of glass spheroids having a refractive index of at least 1.7 and underlying specular-reflecting means, and at least one solid transparent mass of scratch-resistant lens material firmly fixed by transparent cured resinous bonding material in front of said layer of reflex-reflecting material within the dimensional limits aforedefined, said solid mass of lens material having an exposed convex curved surface opposite the side thereof fixed in front of said reflex-reflecting material, the average radius of curvature of said lens material being at least 10 times greater than the average radius of the glass spheroids in said markers, said markers being such that, when subjected to wear as by vehicular tires passing thereover in use, the solid mass of lens material serves as an obstruction to wear damage of the reflex-reflecting material firmly fixed thereto.

2. Markers according to claim 1 in which said reflex-reflecting material of said markers is firmly bonded over its entire front face to said solid transparent mass of said markers by means of said transparent cured resinous bonding material of said markers.

3. Markers according to claim 1 in which said reflex-reflecting material of said markers has a lenticular front face and in which the air interface over at least a portion of the lenticular front face of said reflex-reflecting material is maintained, with said transparent cured resinous bonding material of said markers being out of contact with said portion of said lenticular front face having said air interface.

4. Markers according to claim 1 having at least two layers of said reflex-reflecting material and at least two of said transparent masses of material, with a solid transparent mass of material firmly fixed in front of each said layer of reflex-reflecting material, and with a build-up of cured resinous material extending over the top and bottom of the area of juncture containing said reflex-reflecting material between said transparent masses of material for further shielding said reflex-reflecting material from traffic wear and for reinforcing said solid transparent masses against breakage.

5. Markers according to claim 1 in which the solid transparent mass is glass.

6. Small horizontally-reflex-reflecting markers of substantial flatness so as to constitute essentially no vertical obstruction when laid upon a horizontal surface, said markers having an essentially flat base surface and being no greater than 10 millimeters in height above said base surface, with area dimensions perpendicular to said height dimension all being at least 1.2 times greater than said height dimension and no greater than 80 times said height dimension, each of said markers comprising at least one layer of reflex-reflecting material oriented essentially perpendicular to the flat base surface thereof, said reflex-reflecting material consisting essentially of a monolayer of glass spheroids having a refractive index of at least 1.7 and underlying specular-reflective means, and at least one solid transparent mass of scratch-resistant lens material firmly fixed by transparent cured resinous bonding material in front of said layer of reflex-reflecting material within the dimensional limits aforedefined, said solid mass of lens material having an exposed convex curved surface opposite the side thereof fixed in front of said reflex-reflecting material, the average radius of curvature of said lens material being at least 10 times greater than the average radius of the glass spheroids in said markers, said markers being such that, when subjected to wear as by vehicular tires passing thereover in use, the solid mass of lens material serves as an obstruction to wear damage of the reflex-reflecting material firmly fixed thereto.

7. Small horizontally-reflex-reflecting markers having an essentially flat base surface and being no greater than approximately one inch in height above said base surface, with area dimensions perpendicular to said height dimensions all being at least 1.2 times greater than said height dimension and no greater than 80 times said height dimension, each of said markers comprising at least two layers of reflex-reflecting material oriented essentially perpendicular to the flat base surface thereof, each said layer of reflex-reflecting material consisting essentially of a monolayer of glass spheroids having a refractive index of at least 1.7 and underlying specular-reflecting means, at least two solid transparent masses of scratch-resistant lens material, with a solid transparent mass of said material firmly fixed in front of each said layer of reflex-reflecting material within the dimensional limits aforenoted, each said solid transparent mass of lens material having an exposed convex curved surface opposite the side thereof fixed in front of reflex-reflecting material, the average radius of curvature of said surface being at least 10 times greater than the average radius of the glass spheroids in said marker, and a build-up of resinous material over the area of juncture containing said reflex-reflecting material between said transparent masses of material, said markers being such that, when subjected to wear as by vehicular tires passing thereover in use, the solid masses of lens material and said build-up of resinous material serve as an obstruction to wear damage of said reflex-reflecting material.

8. Small horizontally-reflex-reflecting markers of substantial flatness so as to constitute essentially no vertical obstruction when laid upon a horizontal surface, said markers having an essentially flat base surface, with area dimensions perpendicular to the height dimension all being at least 1.2 times greater than said height dimension and no greater than 80 times said height dimension, each of said markers comprising at least one layer of reflex-reflecting material oriented essentially perpendicular to the flat base surface thereof, said reflex-reflecting material consisting essentially of a monolayer of glass beads having a refractive index of at least 1.7 and underlying specular-reflective means and at least one solid scratch-resistant transparent rod-like mass oriented in front of said layer of reflex-reflecting material within the dimensional limits aforedefined and firmly fixed by transparent cured resinous bonding material in front of said reflex-reflection material, such that, when said markers are subjected to wear as by vehicular tires passing thereover in use, the solid mass of transparent material serves as an obstruction to wear damage of the reflex-reflecting material united thereto.

9. Small discrete horizontally-reflex-reflecting markers having an essentially flat base surface and being no greater in height than approximately one inch above said base surface, with area dimensions perpendicular to said height dimension all being at least 1.2 times greater than said height dimension and no greater than 80 times said height dimension, each of said markers comprising at least one layer of reflex-reflecting material oriented essentially perpendicular to the flat base surface thereof, said reflex-reflecting material consisting essentially of a monolayer of glass beads having a refractive index of at least 1.7 and underlying specular-reflective means, and at least one solid scratch-resistant transparent rod-like mass oriented in front of said layer of reflex-reflecting material within the dimensional limits aforedefined and firmly fixed by transparent cured resinous bonding material in front of said reflex-reflection material, such that, when said markers are subjected to wear as by vehicular tires passing thereover in use, the solid mass of transparent material serves as an obstruction to wear damage of the reflex-reflecting material united thereto.

10. Small horizontally-reflex-reflecting markers of substantial flatness so as to constitute essentially no vertical obstruction when laid upon a horizontal surface, said markers having an essentially flat base surface and being no greater than 10 millimeters in height above said base surface, with area dimensions perpendicular to said height dimension all being at least 1.2 times greater than said height dimension and no greater than 80 times said height dimension, each of said markers comprising at least two layers of reflex-reflecting material oriented essentially perpendicular to the flat base surface thereof, each said layer of reflex-reflecting material consisting essentially of a monolayer of glass beads having a refractive index of at least 1.7 and underlying specular-reflective means, and at least two solid rod-like scratch-resistant transparent masses of material, with a solid transparent mass of material oriented in front of each said layer of reflex-reflecting material within the dimensional limits aforedefined for said markers and firmly fixed by transparent cured resinous bonding material in front of each said layer of reflex-reflecting material, such that, when said markers are subjected to wear as by vehicular tires passing thereover in use, the solid masses of transparent material serve as an obstruction to wear damage of the reflex-reflecting materials united thereto.

11. Small horizontally-reflex-reflecting markers of substantial flatness so as to constitute essentially no vertical obstruction when laid upon a horizontal surface, said members having an essentially flat base surface and being no greater than 10 millimeters in height above said base surface, with area dimensions perpendicular to said height dimension all being at least 1.2 times greater than said height dimension and no greater than 80 times said height dimension, each of said markers comprising at least two layers of reflex-reflecting material oriented essentially perpendicular to the flat base surface thereof, each said layer of reflex-reflecting material consisting essentially of a monolayer of glass speroids having a refractive index of at least 1.7 and underlying specular-reflective means, and at least two solid rod-like transparent masses of scratch-resistant lens material, with a solid transparent mass of said material firmly fixed by transparent cured resinous bonding material in front of each said layer of reflex-reflecting material within the dimensional limits aforenoted, each said solid rod-like transparent mass of lens material having an exposed convex curved surface opposite the side thereof fixed in front of reflex-reflecting material, the average radius of curvature of said surface being at least 10 times greater than the average radius of the glass spheroids in said markers, said markers being such that, when subjected to wear as by vehicular tires passing thereover in use, the solid masses of lens material serve as an obstruction to wear damage of the reflex-reflecting material firmly fixed thereto.

12. Small horizontally-reflex-reflecting markers having an essentially flat base surface and being no greater than approximately one inch in height above said base surface, with area dimensions perpendicular to said height dimension all being at least 1.2 times greater than said height dimension and no greater than 80 times said height dimension, each of said markers comprising at least two layers of reflex-reflecting material oriented essentially perpendicular to the flat base surface thereof, each said layer of reflex-reflecting material consisting essentially of a monolayer of glass beads having a refractive index of at least 1.7 and underlying specular-reflective means, and at least two solid scratch-resistant transparent rod-like masses of material, with a solid transparent mass of material oriented in front of each said layer of reflex-reflecting material within the dimensional limits aforedefined for said markers and firmly fixed by transparent cured resinous bonding material in front of each said layer of reflex-reflecting material, such that, when said markers are subjected to wear as by vehicular tires passing thereover in use, the solid masses of transparent material serve as an obstruction to wear damage of the reflex-reflecting materials united thereto, said markers further having a build-up of resinous material between said transparent masses of material for further shielding said reflex-reflecting material from traffic wear and for reinforcing said solid transparent masses against breakage.

References Cited by the Examiner
UNITED STATES PATENTS

| | | | |
|---|---|---|---|
| 2,232,023 | 2/1941 | Flocks | 94—1.5 |
| 2,354,048 | 7/1944 | Palmquist | 88—82 X |
| 2,407,680 | 9/1946 | Palmquist. | |
| 2,489,499 | 11/1949 | Pellar | 94—1.5 X |
| 2,592,882 | 4/1952 | Fisher | |
| 2,627,784 | 2/1953 | Pellar | 94—1.5 X |
| 2,666,373 | 1/1954 | Mattson | 94—1.5 |
| 2,690,094 | 9/1954 | Becker | 88—81 |

JACOB L. NACKENOFF, *Primary Examiner.*